United States Patent [19]

Harrison

[11] Patent Number: 5,332,267
[45] Date of Patent: Jul. 26, 1994

[54] TUBE COUPLING

[76] Inventor: Donald G. Harrison, 4433 E. Earll Dr., Phoenix, Ariz. 85018

[21] Appl. No.: 91,433

[22] Filed: Jul. 15, 1993

[51] Int. Cl.⁵ .......................................... F16L 27/047
[52] U.S. Cl. ..................................... 285/23; 285/263
[58] Field of Search ................... 285/261, 263, 917, 23

[56] References Cited

U.S. PATENT DOCUMENTS

| | | |
|---|---|---|
| 1,893,442 | 1/1933 | Parker . |
| 1,977,241 | 10/1934 | Parker ................................ 285/86 |
| 3,104,121 | 9/1963 | Nordin et al. .................. 285/917 X |
| 3,273,917 | 9/1966 | Chakroff ........................... 285/263 |
| 3,332,709 | 7/1967 | Kowalski ............................. 285/23 |
| 3,357,723 | 12/1967 | Dumont et al. ..................... 285/263 |
| 3,479,061 | 11/1969 | Smookler et al. ............. 285/263 X |
| 4,343,499 | 8/1982 | Dumar, Jr. et al. ................. 285/263 |
| 4,427,220 | 1/1984 | Decker ............................... 285/263 |
| 4,443,030 | 4/1984 | Hairston ............................. 285/263 |
| 4,779,901 | 10/1988 | Holling ......................... 285/261 X |
| 4,893,847 | 1/1990 | Hess ................................. 285/263 X |

FOREIGN PATENT DOCUMENTS 1450358  12/1968  Fed. Rep. of Germany ...... 285/350

Primary Examiner—Dave W. Arola
Attorney, Agent, or Firm—Warren F. B. Lindsley

[57] ABSTRACT

A tube coupling comprising a male member having a spherical surface at one end for extending into the flared end of a tube with a female member threadedly connected to the male member for providing a clearance space between the spherical surface of the male member and an appropriately configured and sized inside surface of the female member. A unique ferrule having a pair of concentric, spaced apart contact surfaces is mounted in the clearance space between the inside surface of the female member and the flared end of the tube when the spherical seat of the male member is within the flared end of the tube. Upon tightening of the female member on the male member, the ferrule causes the flared end of the tube to deform between its concentric, spaced apart contact surfaces and conform to the spherical seat of the male member to effect sealing.

6 Claims, 1 Drawing Sheet

TUBE COUPLING

BACKGROUND OF THE INVENTION

This invention relates to improvements in fluid connections that are commonly used in fuel, lubrication, cooling and hydraulic systems. More particularly, this invention is directed to a tube coupling with misalignment capabilities for interconnecting two pipe sections and for permitting angular movement of one of the sections relative to the other without the need for attaching a special interface fitting to the tube.

Description of the Prior Art

Various types of conical sealing surfaces are known, however, none are known that produce a ball-joint effect between the fitting and a tube to render the connection insensitive to alignment by the use of a ferrule interface between the tube and a coupling nut.

U.S. Pat. No. 1,893,442 discloses a tube coupling consisting of a male member and a female member for clamping the flared end of a tube wherein the members are provided with tapered seats and the portions carrying the seats are so dimensioned as to yield to bring about an intimate clamping contact between the tapered seats and the flared end of the tube. The female member is formed in two sections, one of which has threaded engagement with the male member, and the other of which carries the seat contacting with the outer face of the flared end of the tube and is free to rotate until the final clamping action on the flared end of the tube. This reference does not have any misalignment capability.

U.S. Pat. No. 1,977,241 is an improvement over U.S. Pat. No. 1,893,442 and discloses a male member with a projecting portion having a clamping seat which is spherical. The tube to be clamped is flared in a spherical contour, the inner surface of which matches the clamping seat of the projecting portion of the male member. An inner sleeve is interposed between the tube and an outer sleeve.

U.S. Pat. No. 4,343,499 discloses a ball joint which has flange and nut with matching spherical surfaces in the seal area. A frusto-conical wear ring seals between the matching surfaces and provides a spring type seal. This references requires that a spherically shaped flange be attached to the tubing or ducting.

U.S. Pat. No. 3,357,723 discloses a bail-and-socket pipe joint having a spherical cup which bears against two metal parts having spherical surfaces. The sealing is a direct function of the accuracy of the spherical contours and the surface finishes thereon.

U.S. Pat. No. 3,273,917 discloses a design that requires a special interface fitting for the tube and there is no deformation involved in the sealing functions. It would appear that the effectiveness in this design is solely a function of the surface finish on the sealing surfaces and the uniformity of loading by the coupling nut.

U.S. Pat. No. 3,332,709 discloses a design that requires an adapter for the tube and there is no deflection to effect sealing. The criticality of the contours and finish of the spherical surfaces has been minimized by the use of resilient packings (O-rings).

German Patent No. 1,450,358 discloses a fitting similar to the above patent references.

U.S. Pat. No. 1,977,241 appears to be similar to the subject matter of the invention disclosure herein wherein a tube is mated directly to a spherical surface of a fitting, thereby eliminating the need for a special interface fitting to be first attached to the tube. In reviewing the accompanying text of this patent, several features of the claimed invention appear that set this disclosure apart from U.S. Pat. No. 1,977,241 and make this invention unique.

By using a split ferrule design or a two-piece welded coupling nut to trap a one-piece ferrule as disclosed herein, the degree of misalignment capability is improved. The only other approach to a split ferrule design or two piece welded coupling nut is to use a larger thread size than that found on the comparably sized conical fitting, which then adds considerably to the weight and bulk of the fitting. U.S. Pat. No. 1,977,241 provides for the movement of a tube and ferrule to accommodate misalignment and is limited by the requirement that the ferrule passes through the coupling nut threads during assembly. The line-to-line contact for the misaligned condition is not realistic from a practical standpoint, as sufficient clearance must be present in the fully installed condition to permit removal of the coupling nut along the fitting axis without contacting the misaligned ferrule until the nut has disengaged the fitting threads. Without that capability, binding of the threads would occur.

U.S. Pat. No. 1,977,241 describes the portion of the sleeve (ferrule) "yielding" as the coupling nut is tightened, which, within the context of material properties of the ferrule is not accurate if the joint is to remain tight. It appears that the ferrule deflects to load the spherical flared surface of the tube against the fitting to effect the seal with he ferrule acting in the manner of a spring washer.

The sleeve appears to be of approximately the same thickness as the interfacing flare on the tube which raises the question as to whether sufficient loading can be applied to the flare to effect a reliable seal if the inside contour of the flare is not accurately conformed to match the contour of the fitting. Such is even more critical with regard to differences in tube wall thickness, which may vary from less than 0.020 to 0.040 of an inch or more, which may partially explain why the concept as defined by this patent is not now, nor has ever been in common usage.

Accommodating various tube wall thicknesses presents no problem with the basic conical fitting disclosed herein, since the flared surface is loaded between two essentially rigid, non-deflecting members (the fitting and ferrule) and the same concept modified to fit a spherical interface is used herein.

In summary, the differences between the claimed subject matter disclosed herein and the disclosure of U.S. Pat. No. 1,977,241 are as follows:

1. U.S. Pat. No. 1,977,241 discloses spherically shaped tube surface interfacing with a matching spherical surface on the fitting. As disclosed herein, a conically shaped tube surface (initially) interfaces with a spherical surface of the fitting.

2. U.S. Pat. No. 1,977,241 has a tube being loaded against the fitting by a flexible portion of the ferrule. The ferrule is rigid (non-flexible) in the invention disclosed herein.

3. In the fully installed (tightened) condition, U.S. Pat. No. 1,977,241 discloses a flared surface of a tube loaded between two spherical surfaces. As claimed herein, a tube is loaded between a spherical surface and a unique ferrule that loads the tube through two circular, concentric but axially spaced apart surfaces. An annular cavity for the loaded tube to deflect into is provided. The tube surface is therefore free to conform to the surface of the fitting for sealing purposes as the coupling nut is tightened and the need for precise dimensional control of two spherical surfaces (or even the one on the fitting) in order to effect a reliable seal is eliminated.

4. By using the conical ferrule concept for a spherical fitting (one-piece, passing through the coupling nut threads during assembly), the misalignment capability of U.S. Pat. No. 1,977,241 is limited without a considerable increase in size and weight relative to a comparable fitting size of a conical configuration. In the disclosure claimed herein, the same size thread is maintained for the spherical fitting as is used with a conical fitting for the same size tube. Size and weight increase of the coupling nut is only in the ferrule cavity area and is minimal.

BRIEF DESCRIPTION OF THE DRAWING

The present invention may be more readily described by reference to the accompanying drawing in which.

DESCRIPTION OF THE PREFERRED EMBODIMENT

Figure 1:
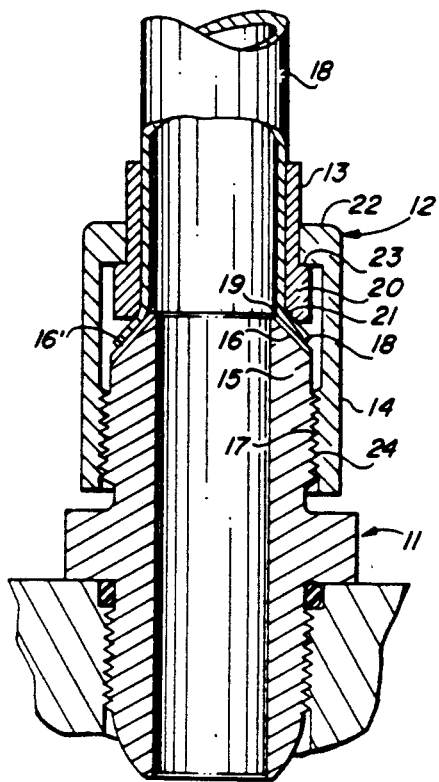
FIG. 1 is a vertical sectional view through a coupling embodying the prior art.

Referring more particularly to the drawing by characters of reference, FIG. 1 discloses a commonly used fitting 10 of the prior art which has a conical sealing surface between the fitting and the interfacing flared tube, the angle of this conical surface with the centerline of this fitting being approximately 37 degrees.

There are two problem areas inherent in this 37 degree prior art design, namely:

1. The basic conical sealing surface is sensitive to accurate alignment of the mating tube with the fitting if leakage problems are to be avoided. The problem becomes more acute as the size and number of bends in the tubing (tolerance accumulation) increases and the ability of the mechanic to make "minor" adjustments during installation is reduced accordingly, particularly if the line run is short. Getting the fitting on one end engaged with one or two threads and then forcing the opposite end into sufficient alignment to get thread engagement is a commonly used technique but often results in a leak shortly after installation. A common remedial approach to avoid leakage is to install a soft, crushable copper gasket between the fitting and flared surface of the tube. Whenever the plumbing is removed for inspection and/or replacement, a new gasket must be installed to ensure a continued leak-free fitting.

2. The second problem is the susceptibility of the 37 degree flared fitting to loosening, particularly in applications where there is a significant level of vibration such as with internal combustion engines. On aircraft in particular, the large number of fittings used, together with the need for maximum reliability, results in a considerable number of maintenance hours consumed just in lockwiring such fittings on the various engine and airframe fluid systems.

As shown in FIG. 1 of the drawing, fitting 10 comprises a male member 11 and a female member 12 which includes an inner sleeve section 13 and an outer sleeve section 14. The male member 11 is provided with a projection portion 15 having a tube clamping seat 16 which is conical in form. A gasket 16' may also be inserted between the clamping seat 16 and the inner surface of the tube flare for sealing purposes. The male member 11 is provided with threads 17. Tube 18 which is to be clamped has its ends flared as shown at 19. The inner face of the flared end of tube 18 is preferably made conical by a proper shaping tool, and the conical surface is formed to substantially the same 37 degree angle as the conical surface of the seat on the male member 11 so that when the male member 11 is placed in engagement with the tube end, the flared end of the tube will make contact with the conical seat 16 on the male member.

The inner sleeve 13 of the female member 12 is provided with an annular shoulder 20. The outer face 21 of this shoulder is conical. The sleeve at this time is in contact with the outer flared surface of tube 18. The outer sleeve section 14 of the female member 12 is provided with an annular shoulder 22 having its under face 23 in contact with the outer face on annular shoulder 20. The outer sleeve section 14 of the female member 12 is provided with threads 24 which engage threads 17 on male member 11 for clamping the tube end.

The intent of the improved fitting disclosed herein is to provide a fitting with misalignment capabilities without the need to attach a special fitting to the tube.

Figure 2:
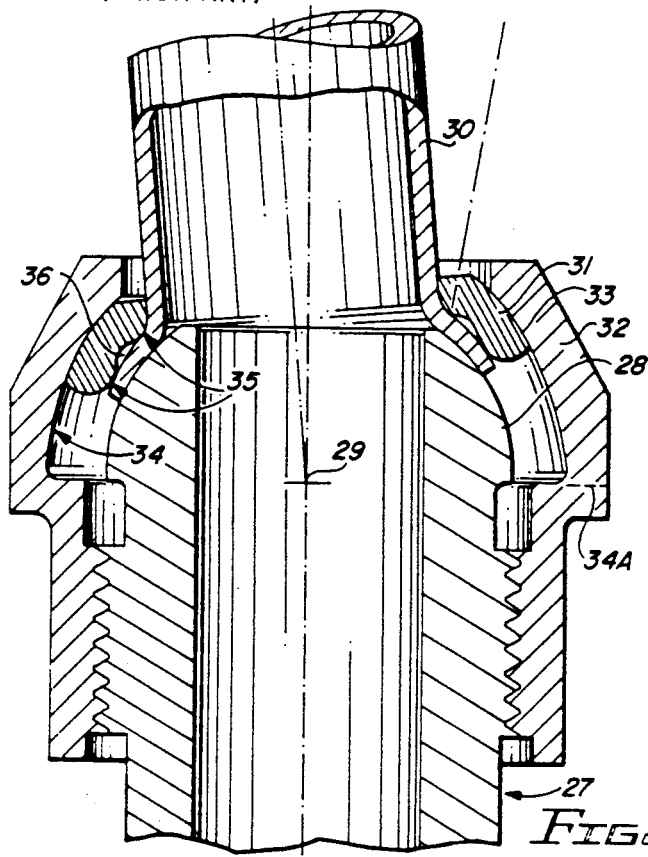
FIG. 2 is a view similar to FIG. 1 but embodying the invention.
Figure 3:
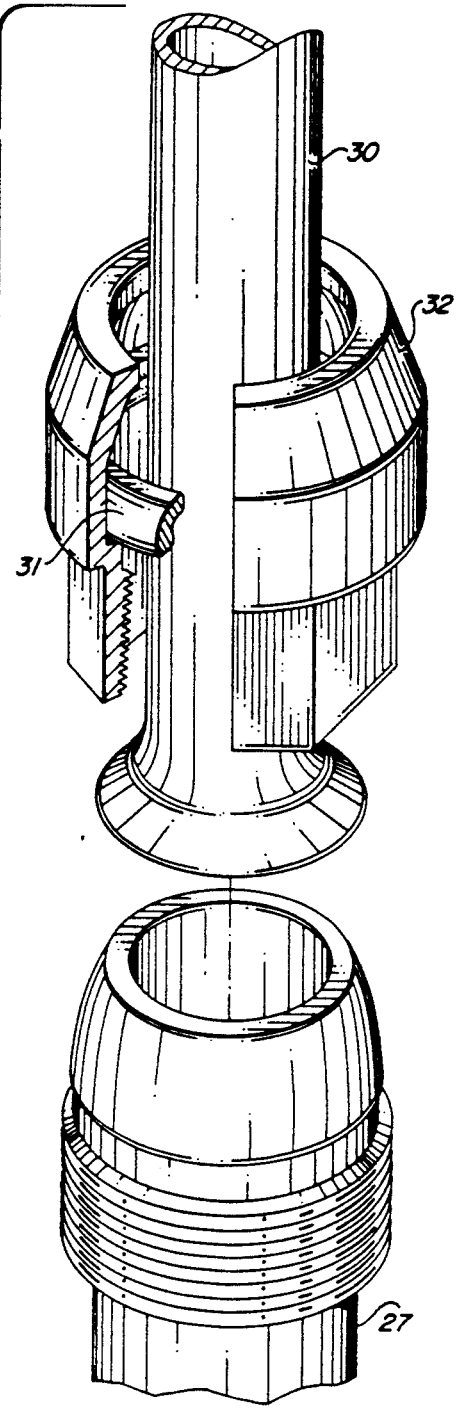
FIG. 3 is an exploded perspective view partially broken away to more clearly illustrate the features of FIG. 2.

The improved design, as shown in FIGS. 2 and 3, is intended to eliminate both of the aforementioned problems with the existing 37 degrees fitting. In place of the conical sealing surface, a proposed male member or fitting 27 utilizes a spherical surface 28 with center located at 29 that produces a ball-jointed effect between male fitting 27 and tube 30 to render the connection insensitive to alignment within a chosen design range.

The flare on tube 30 for the improved design is conical just as with the 37 degree prior art fitting although development may show that a different angle is more suitable. A ferrule 31 interfaces between tube 30 and a female member or coupling nut 32 once the flaring operation on tube 30 is completed. The outer surface 33 of ferrule 31 is also spherical, the center coinciding with center 29 of fitting spherical surface 28 when the connection is secured. An appropriately configured and sized surface 34 on the coupling nut 32 interfaces with the outer ferrule surface 33 to accommodate the angularity of tube 30 and still uniformly transmit loading to the outside surface of the tube flare as the coupling nut is tightened. Surface 34 may vary in configuration from a spherical contour that matches surface 33 on the ferrule to a conical surface that provides for ease of manufacture.

It should be noted that a straight conical surface bearing against ferrule 31 may accomplish the same benefits as a matched spherical surface and would be easier to fabricate. The tolerances would have to be such that the maximum radius on the ferrule is always less than the minimum radius on coupling nut 32.

The one-piece ferrule 31 requires that coupling nut 32 be fabricated in two pieces and joined by a suitable technique such as E-bean or laser welding at location 34A after ferrule 31 is installed between the two sections. A split ferrule design would permit a one-piece coupling nut to be used.

Initial contact of the conical, flared surface of tube 30 and spherical surface 28 of fitting 27 produces a line interface. As coupling nut 32 is engaged and tightened, two concentric, spaced apart and convexly shaped contact surfaces 35 on ferrule 31 force the conical, flared surface of the tube 30 to conform to the spherical surface 28 of the fitting to increase the line contact to a sealing land of definitive width. A relief 36 between the two contact surfaces 35 provides a space to accommodate the flared surface of the tube as it is deformed between the two ferrule contact surfaces 35 to match the spherical surface 28 of the fitting. The deformation of the tube flare is minimal though and the tube material does not yield. A positive spring loading thus remains, very similar to that obtained with a lockwasher or, more precisely, that obtained with a Belleville type of lockwasher. The net result is that the installation torque can be less than that required for the standard fitting to effect a seal and, as with lockwashers, the need for lockwiring is eliminated.

Although but one embodiment has been illustrated and described, it will be apparent to those skilled in the art that various changes and modifications may be made therein without departing from the spirit of the invention or from the scope of the appended claims.

What is claimed is:

1. A tube coupling comprising male and female members having threaded engagement with each other,
   said male member having a spherical outside surface at one end forming a seat adapted to extend into the flared end of a tube,
   said female member being threadedly connected to said male member to provide a clearance space between the spherical surface of said male member and an appropriately configured and sized inside surface of said female member,
   a ferrule mounted within said clearance space between said inside surface of said female member and the flared end of the tube when said spherical seat of said male member is within the flared end of the tube,
   said ferrule comprising an elongated member having a spherical outer surface in contact with said inside surface of said female member and a pair of concentric, spaced apart contact surfaces defining a space therebetween on an opposite surface of said ferrule for engaging the flared end of the tube,
   whereby upon tightening of said female member on said male member increases the pressure said ferrule on the flared end of the tube and said space between said pair of concentric, spaced apart contact surfaces accommodate the flared surface or the tube as it is deformed between the two contact surfaces of said ferrule to match the spherical surface of said male member.

2. The tube coupling set forth in claim 1 wherein:
   said ferrule comprises an endless configuration fitted and held within said clearance space.

3. The tube coupling set forth in claim 2 wherein:
   said inside surface of said female member defines an annular shoulder for holding said ferrule within said clearance space.

4. The tube coupling set forth in claim 3 wherein:
   said ferrule comprises a two piece configuration held within said female member by its annular shoulder.

5. The tube coupling set forth in claim 1 wherein:
   said female member comprises two annular members that are secured together after placement of said ferrule within said clearance space.

6. The tube coupling set forth in claim 1 wherein:
   said ferrule comprises a rigid configuration.

* * * * *